US009477106B2

(12) United States Patent
Zhu et al.

(10) Patent No.: US 9,477,106 B2
(45) Date of Patent: Oct. 25, 2016

(54) ARRAY SUBSTRATE OF LCD DISPLAY AND A MANUFACTURING METHOD THEREOF

(71) Applicants: BOE TECHNOLOGY GROUP CO., LTD., Beijing (CN); BEIJING BOE DISPLAY TECHNOLOGY CO., LTD., Beijing (CN)

(72) Inventors: Xiaming Zhu, Beijing (CN); Liang Sun, Beijing (CN); Jianfeng Yuan, Beijing (CN); Seung Moo Rim, Beijing (CN); Xibin Shao, Beijing (CN)

(73) Assignees: BOE TECHNOLOGY GROUP CO., LTD. (CN); BEIJING BOE DISPLAY TECHNOLOGY CO., LTD. (CN)

( * ) Notice: Subject to any disclaimer, the term of this patent is extended or adjusted under 35 U.S.C. 154(b) by 170 days.

(21) Appl. No.: 14/103,274

(22) Filed: Dec. 11, 2013

(65) Prior Publication Data

US 2014/0160418 A1  Jun. 12, 2014

(30) Foreign Application Priority Data

Dec. 11, 2012  (CN) .......................... 2012 1 0530678

(51) Int. Cl.
*G02F 1/1362* (2006.01)
*G02F 1/1345* (2006.01)
(Continued)

(52) U.S. Cl.
CPC ........... *G02F 1/1333* (2013.01); *G02F 1/1309* (2013.01); *G02F 1/1345* (2013.01);
(Continued)

(58) Field of Classification Search
CPC ............. G02F 1/1309; G02F 2202/22; G02F 1/136204; G02F 1/1345; G02F 1/136286; G02F 1/1333; G02F 1/13439; G02F 1/134309; H01L 27/0292
See application file for complete search history.

(56) References Cited

U.S. PATENT DOCUMENTS 6,184,948 B1 *  2/2001  Lee .................... G02F 1/13458
                                                257/443
(Continued)

FOREIGN PATENT DOCUMENTS

CN       1517771       8/2004
CN      101621038      1/2010
(Continued)

OTHER PUBLICATIONS

Notification of First Office Action, App. No. 201210530678.1.

*Primary Examiner* — Paul Lee
*Assistant Examiner* — Jia Pan
(74) *Attorney, Agent, or Firm* — Bakerhostetler LLP

(57) ABSTRACT

The present invention provides an array substrate of LCD display and a manufacturing method thereof, the array substrate comprises a transparent substrate, gate lines and data lines which are disposed on the transparent substrate, wherein the array substrate further comprises: a transparent conducting bar and a gate short-circuit bar which are disposed on the transparent substrate, said transparent conducting bar is disposed below said gate short-circuit bar, said gate short-circuit bar and said data lines are arranged in a same layer. The present invention can avoid the problem of burning the gate short-circuit bar due to the occurrence of static discharge, the electrical defects in the array substrate can be normally detected and repaired in the array test process, thus the qualified product rate of the array substrate of LCD display is improved.

8 Claims, 14 Drawing Sheets

(51) Int. Cl.
*G02F 1/1333* (2006.01)
*G02F 1/13* (2006.01)
*G02F 1/1343* (2006.01)

(52) U.S. Cl.
CPC ... *G02F1/136204* (2013.01); *G02F 1/136286* (2013.01); *G02F 2001/134372* (2013.01); *G02F 2201/121* (2013.01); *G02F 2202/22* (2013.01)

(56) References Cited

U.S. PATENT DOCUMENTS

2002/0085141 A1* 7/2002 Kim ............... G02F 1/13458 349/43

2012/0169346 A1* 7/2012 Huang ............... G02F 1/1309 324/414
2013/0044285 A1* 2/2013 Huang ............. G02F 1/134363 349/141
2013/0321730 A1* 12/2013 Huang ................ G09G 3/006 349/41

FOREIGN PATENT DOCUMENTS

CN 102566167 7/2012
CN 203101786 7/2013

* cited by examiner

ARRAY SUBSTRATE OF LCD DISPLAY AND A MANUFACTURING METHOD THEREOF

CROSS REFERENCE

The present application claims a priority of the Chinese patent application No. 201210530678.1 filed on Dec. 11, 2012, which is incorporated herein by reference in its entirety.

BACKGROUND OF THE INVENTION

1. Field of the Invention

The present invention relates to the field of liquid crystal display (LCD), especially an array substrate of LCD display and a manufacturing method thereof.

2. Description of the Prior Art

FIG. 1 shows a schematic view of plane structure of an array substrate of FFS LCD display in the prior art, all gate lines of the array substrate structure are connected by an unilateral gate short-circuit bar. In the manufacturing process of the array substrate of LCD display, the prevention and control of electrostatic discharge is an important work. Plasma enhanced chemical vapor deposition is performed on the array substrate which has formed a gate metal layer pattern so as to form a gate insulator layer, the gate metal layer pattern will induce static charge under the action of the plasma electric field. In the existing structure of the array substrate, the induced charges accumulated on different potentials of the gate lines may transfers and achieve balance via the gate short-circuit bar, if the balance course of the static charge is completed in nanosecond or millisecond order, the static discharge will occurred. The peak current of the static discharge will reach dozens of ampere, the power of the moment is very large, and the produced electromagnetic pulse of the static charge can burn the gate short-circuit bar and even the gate line metal, resulting in that test signal can not be loaded on the array substrate in the subsequent array test process, so that the detection and the maintenance of the electrical detect will be negatively influenced, and the qualified product rate of the array substrate will be notably reduced.

SUMMARY OF THE INVENTION

The technical problem to be solved by the present invention is to provide an array substrate of LCD display and a manufacturing method thereof so as to solve the problem that in the prior art, due to occurrence of static discharge, the gate short-circuit bar and even the gate line metal is burnt in the gate insulator layer forming process of the array substrate which has formed the gate metal layer pattern.

To solve the above-mentioned problem, the embodiment of the present invention provides an array substrate of LCD display, comprising a transparent substrate, gate lines and data lines which are disposed on the transparent substrate, the array substrate further comprises: a transparent conducting bar and a gate short-circuit bar which are disposed on the transparent substrate, said transparent conducting bar is disposed below said gate short-circuit bar, said gate short-circuit bar and said data lines are arranged in a same layer.

Preferably, the width of said transparent conducting bar is larger than the width of said gate short-circuit bar.

Preferably, the array substrate further comprises a common electrode disposed on the transparent substrate, said common electrode and said transparent conducting bar are arranged in the same layer.

Specifically, the array substrate further comprises:
a gate insulator layer, disposed on a gate electrode and the gate lines and covers the whole substrate;
a semiconductor active layer, data lines and the gate short-circuit bar, a source electrode and a drain electrode, disposed above said gate insulator layer;
a passivation layer, disposed on said source electrode and said drain electrode and covers the whole substrate, said passivation layer has passivation layer via holes formed at positions corresponding to the drain electrode, the gate lines and the gate short-circuit bar; and
a second transparent conducting layer disposed on the substrate which has formed said passivation layer via holes; a pixel electrode formed based on said second transparent conducting layer is disposed on said passivation layer and is connected with said drain electrode through said passivation layer via holes; a connection portion formed based on said second transparent conducting layer is respectively connected with said gate lines and said gate short-circuit bar through the passivation layer via hole so as to connect said gate lines with said gate short-circuit bar.

The embodiment of the present invention further provides a manufacturing method of an array substrate of LCD display, the method comprises:
forming a first transparent conducting layer on a transparent substrate, forming a common electrode and a transparent conducting bar by a patterning process; said transparent conducting bar is disposed at the preset position of a gate short-circuit bar;
forming a gate metal layer on the substrate which has formed the first transparent conducting layer pattern, forming gate lines, a gate electrode, an even data short-circuit bar or an odd data short-circuit bar by a patterning process; and
forming a gate insulator layer, a semiconductor layer, an ohm contact layer and a data metal layer on the substrate which has formed a gate metal layer pattern, forming the gate short-circuit bar, the odd data short-circuit bar or the even data short-circuit bar, odd data lines, even data lines, a source electrode, a drain electrode and a semiconductor active layer by a patterning process, said patterning process comprises half tone mask exposure process or gray tone mask exposure process.

Preferably, the width of the formed transparent conducting bar is larger than the width of said gate short-circuit bar.

Preferably, said gate metal layer is made of molybdenum, chromium, copper, molybdenum/aluminium/neodymium or molybdenum/aluminium/molybdenum multilayer films;
said data metal layer is made of molybdenum, chromium, copper, molybdenum/aluminium/neodymium or molybdenum/aluminium/molybdenum multilayer films.

Specifically, the method further comprises:
forming a passivation layer on the substrate which has formed the data metal layer pattern, and forming passivation layer via holes by a patterning process; and
forming a second transparent conducting layer on the substrate which has formed the passivation layer via holes, forming a pixel electrode and a connection portion by a patterning process, and said pixel electrode is connected with said drain electrode through the passivation layer via hole, said connection portion is respectively connected with said gate lines and said gate short-circuit bar through the passivation layer via hole so as to connect said gate lines with said gate short-circuit bar.

Preferably, said first transparent conducting layer and said second conducting layer are made of tin indium oxide, antimony doped tin oxide, aluminum doped zinc oxide or indium doped zinc oxide thin films.

The advantages of above technical solution of the present invention are that: the transparent conducting bar is added below the gate short-circuit bar, the gate short-circuit bar and the date lines are arranged in the same layer. The transparent conducting bar has a larger width and can bear larger flowing current; furthermore, the thickness of the transparent conducting bar is very thin and the resistance of which is larger than that of the gate metal, the resistance of the transparent conducting bar is much larger than that of the gate short-circuit bar in the prior art. In the forming process of the gate insulator layer, the induced charges on different potentials of the gate lines can transfer in an flowing current which the transparent conducting bar can bear through the transparent conducting bar and achieve balance, the gate short-circuit bar is formed on the data metal layer, and it can avoid the problem of burning the gate short-circuit bar and even the gate lines due to the occurrence of static discharge, the electrical defects in the array substrate can be normally detected and repaired in the array test process, thus the qualified product rate of the LCD array substrate is improved.

Figure 1:
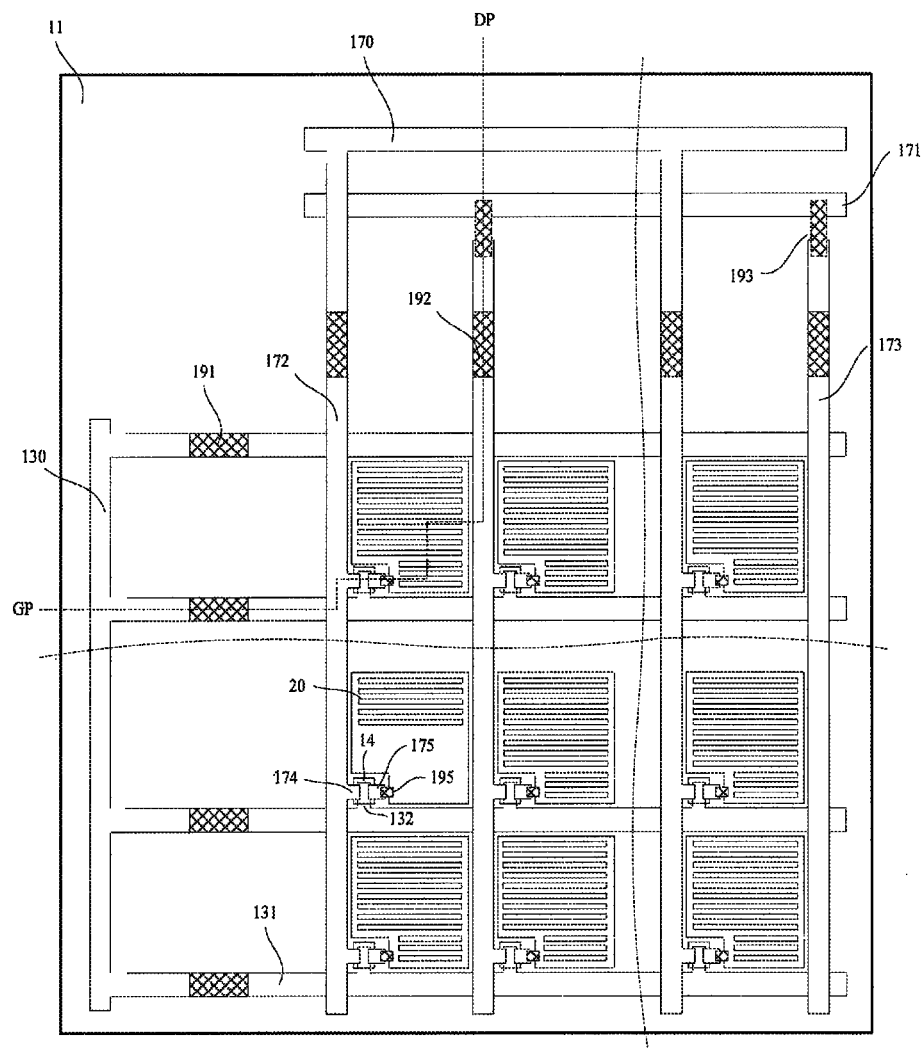
FIG. 1 shows a schematic view of plane structure of an array substrate of FFS LCD display in the prior art.

Transparent substrate 11
Common electrode 120
Transparent conducting bar 121
Gate short-circuit bar 130
Gate lines 131
Gate electrode 132
Gate insulator layer 14
semiconductor active layer 15
ohm contact layer 16
odd date short-circuit bar 170
even data short-circuit bar 171
odd date lines 172
even date lines 173
source electrode 174
drain electrode 175
passivation layer 18
passivation layer via holes 191, 192, 193, 194, 195
pixel electrode 20
second transparent conducting layer thin film at the via holes 201, 202, 203, 204, 205

DETAILED DESCRIPTION OF THE PREFERRED EMBODIMENTS

Hereafter, with reference to the drawings, the embodiments will be described in detail so as to make the technical problem to be solved, the technical solution and the advantages clearer.

The patterning process generally comprises steps of photoresist coating, exposure, development, etching, photoresist stripping and so on.

Figure 2:
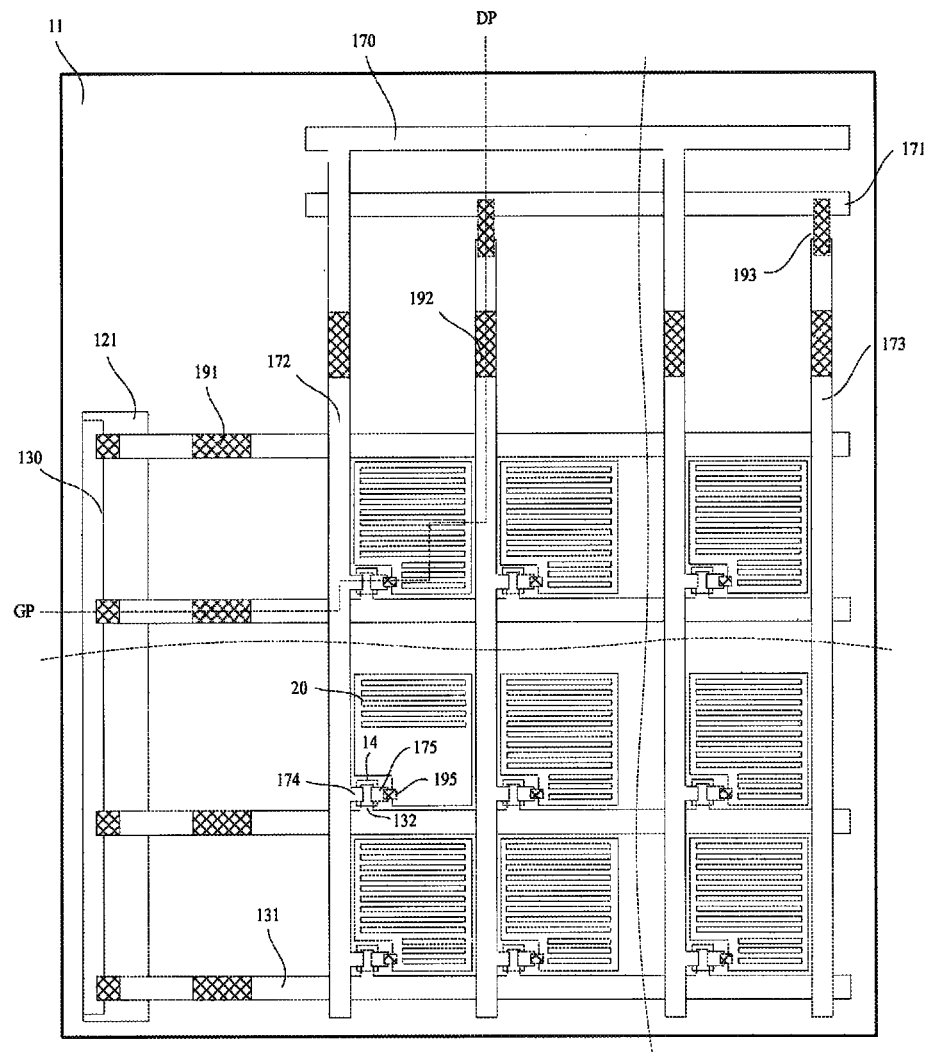
FIG. 2 shows a schematic view of plane structure of an array substrate of the embodiment of the present invention.

The embodiment of the present invention provides an array substrate of LCD display, as shown in FIG. 2, which comprises a transparent substrate 11, gate lines 131 and data lines which are disposed on the transparent substrate, the array substrate further comprises: a transparent conducting bar 121 and a gate short-circuit bar 130 which are disposed on the transparent substrate, the transparent conducting bar 121 is disposed below the gate short-circuit bar 130, the gate short-circuit bar 130 and the data lines are arranged in a same layer.

The plane structure of the array substrate of LCD display produced by employing the manufacturing method in the embodiment of the present invention is shown in FIG. 2, the transparent conducting bar 121 is added below the gate short-circuit bar 130, the width of the transparent conducting bar 121 is larger than that of the gate short-circuit bar and can bear larger flowing current, the resistance of the transparent conducting bar 121 is also larger than that of the gate short-circuit bar in the prior art. In the forming process of gate insulator layer, the induced charges accumulated on different potentials of the gate lines 131 transfer through the transparent conducting bar 121 in an flowing current which the transparent conducting bar can bear and achieve balance. Furthermore, the gate short-circuit bar 130 is formed on the data metal layer, and it can avoid the problem of burning the gate short-circuit bar 130 due to the occurrence of static discharge, the electrical defects in the array substrate can be normally detected and repaired in the array test process, thus the qualified product rate of the array substrate of LCD display is improved.

The data lines of the embodiment comprise odd data lines 172 and even data lines 173.

In a preferred embodiment, the width of the transparent conducting bar 121 is larger than the width of the gate short-circuit bar 130.

In a preferred embodiment, the array substrate further comprises a common electrode 120 disposed on the transparent substrate, the common electrode 120 and the transparent conducting bar 121 are arranged in the same layer.

In a preferred embodiment, the array substrate further comprises:

a gate insulator layer 14, disposed on gate electrode 132 and gate lines 131 and covers the whole substrate;

a semiconductor active layer, data lines and gate short-circuit bar 130, a source electrode and a drain electrode, disposed above the gate insulator layer 14;

a passivation layer, disposed on the source electrode and the drain electrode and covers the whole substrate, the passivation layer has passivation layer via holes formed at positions corresponding to the drain electrode 175, the gate lines 131 and the gate short-circuit bar 130; and a second transparent conducting layer disposed on the substrate which has formed the passivation layer via holes; a pixel electrode formed based on the second transparent conducting layer is disposed on the passivation layer and is connected with the drain electrode 175 through the passivation layer via holes; a connection portion formed based on the second transparent conducting layer is respectively connected with the gate lines 131 and the gate short-circuit bar 130 through the passivation layer via hole so as to connect the gate lines 131 with the gate short-circuit bar 130.

Figure 4:
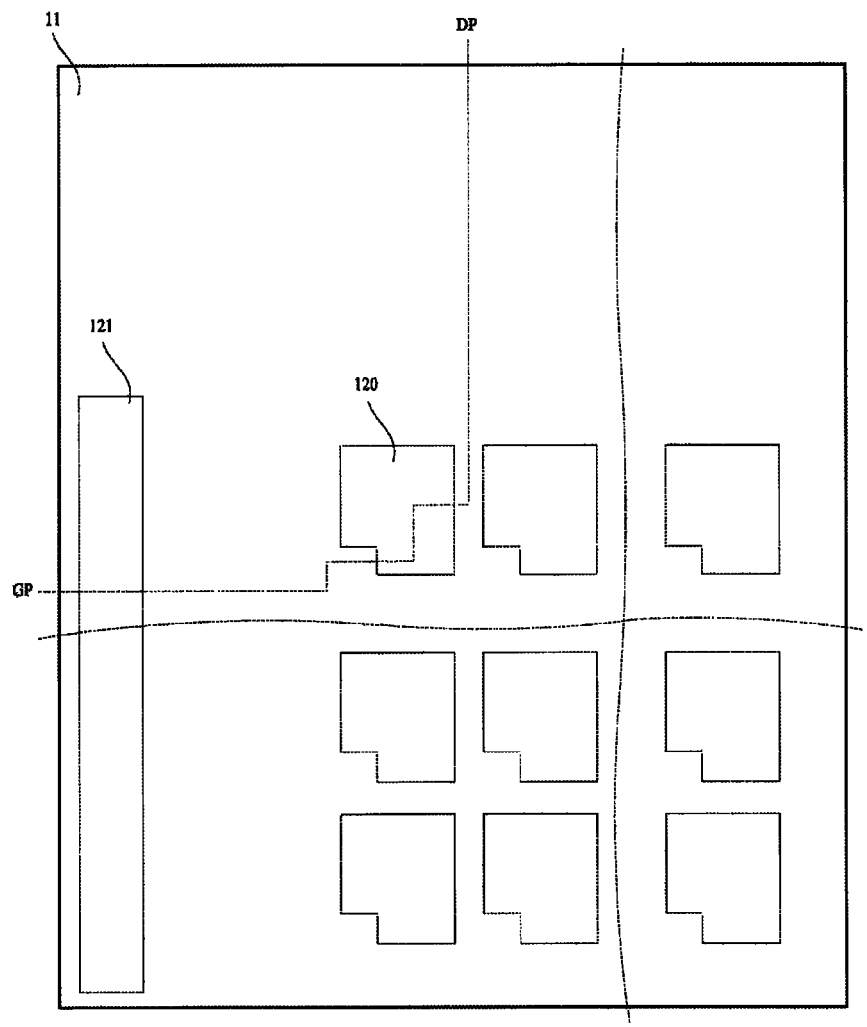
FIG. 4 shows a schematic view of plane structure of the array substrate after a first patterning process.
Figure 5:
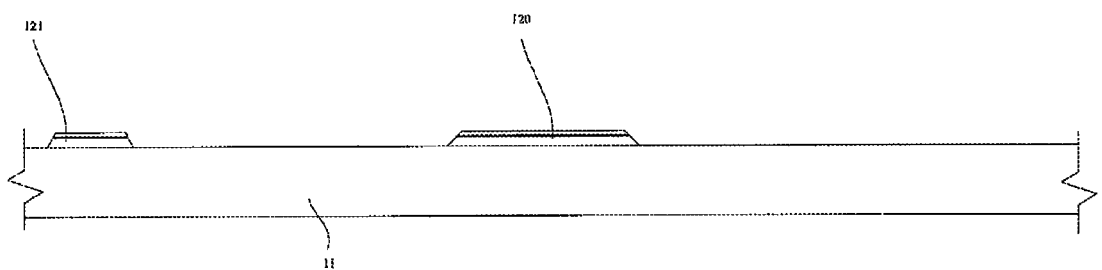
FIG. 5 shows a cross sectional view along the direction of GP-DP dotted line after the first patterning process.

In an application scene, employing the provided technology, the manufacturing procedure of array substrate by several patterning processes comprises:

Step 1, performing a first patterning process, comprising: forming a first transparent conducting layer on the transparent substrate 11, forming the common electrode 120 and the transparent conducting bar 121 by means of once exposure and once wet etching process, the transparent conducting bar 121 is disposed at a preset position of the gate short-circuit bar 130, and the width of the transparent conducting bar 121 is larger than the width of the gate short-circuit bar 130, as shown in FIGS. 4 and 5.

Figure 6:
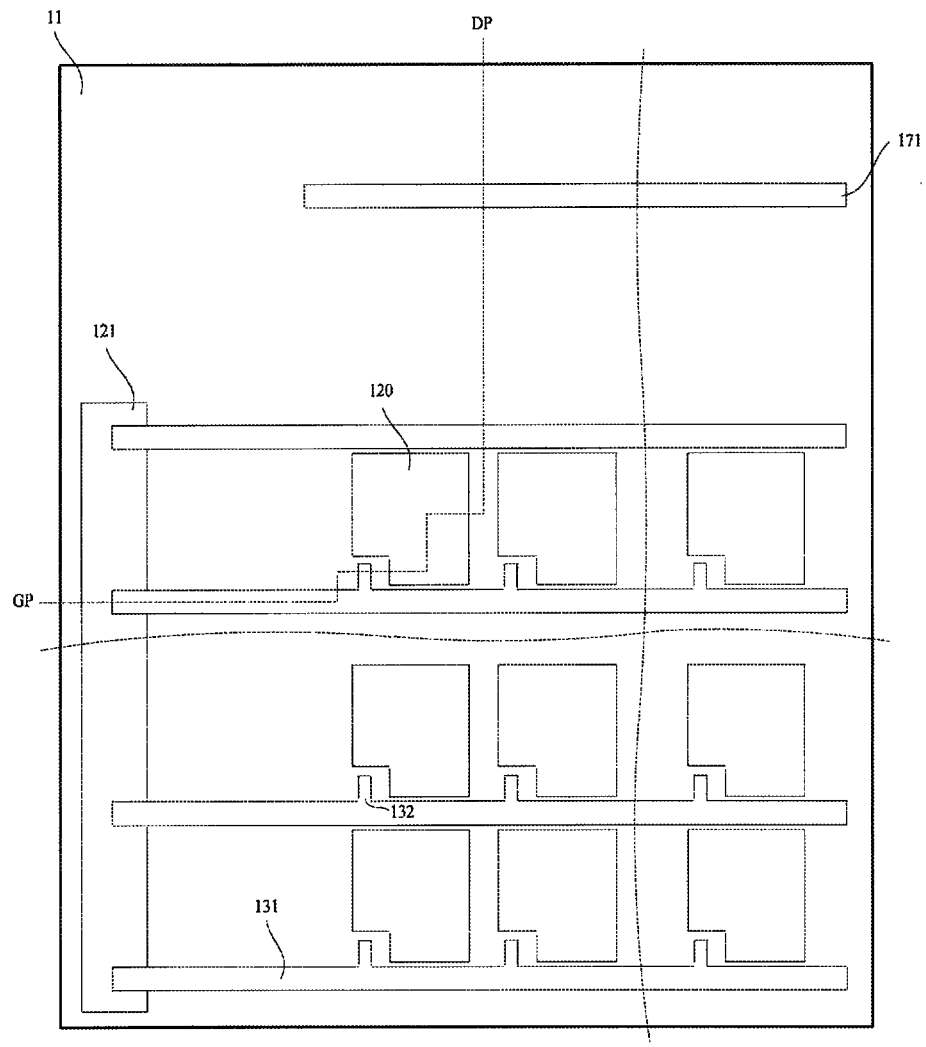
FIG. 6 shows a schematic view of plane structure of the array substrate after a second patterning process.
Figure 7:
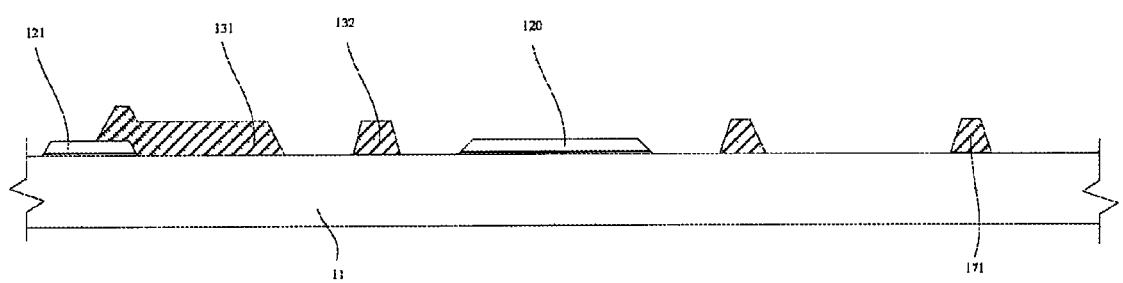
FIG. 7 shows a cross sectional view along the direction of GP-DP dotted line after the second patterning process.

Step 2, performing a second patterning process, comprising: forming the gate metal layer on the substrate which has formed the first transparent conducting layer pattern, forming the gate lines 131, the gate electrode 132 and the even the data short-circuit bar 171 by means of once exposure and once wet etching process, as shown in FIGS. 6 and 7.

Figure 8:
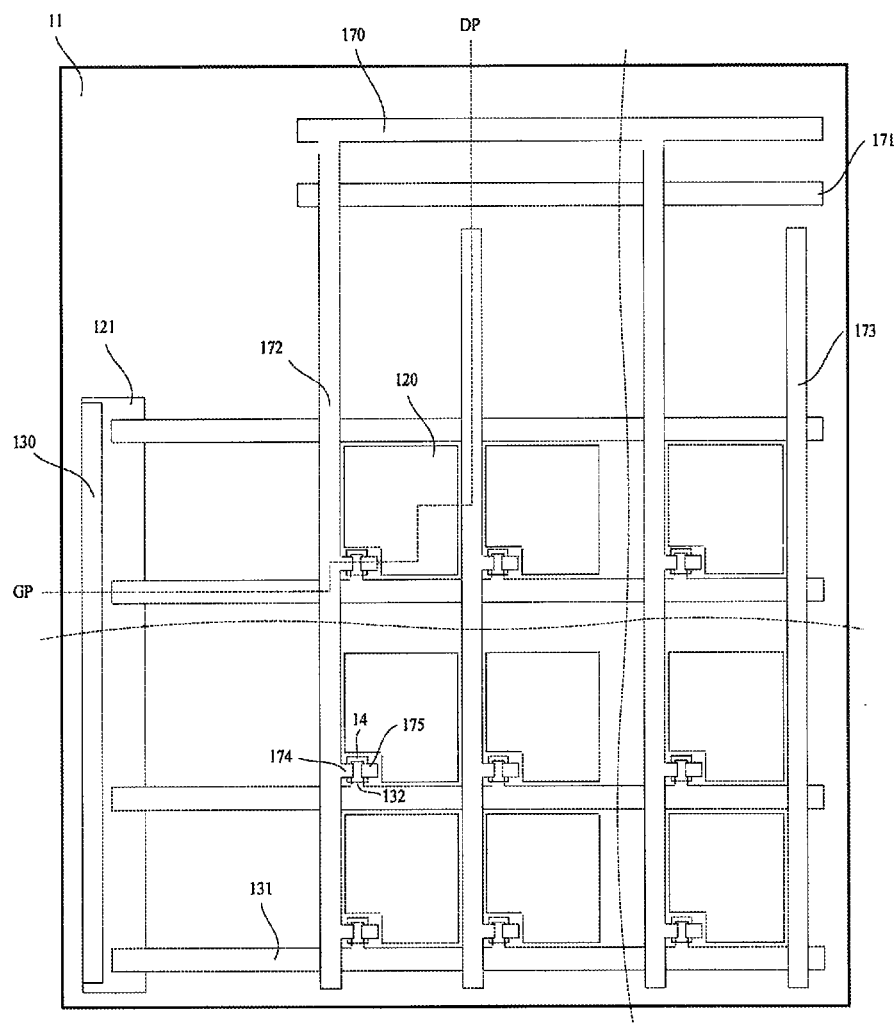
FIG. 8 shows a schematic view of plane structure of the array substrate after a third patterning process.
Figure 9:
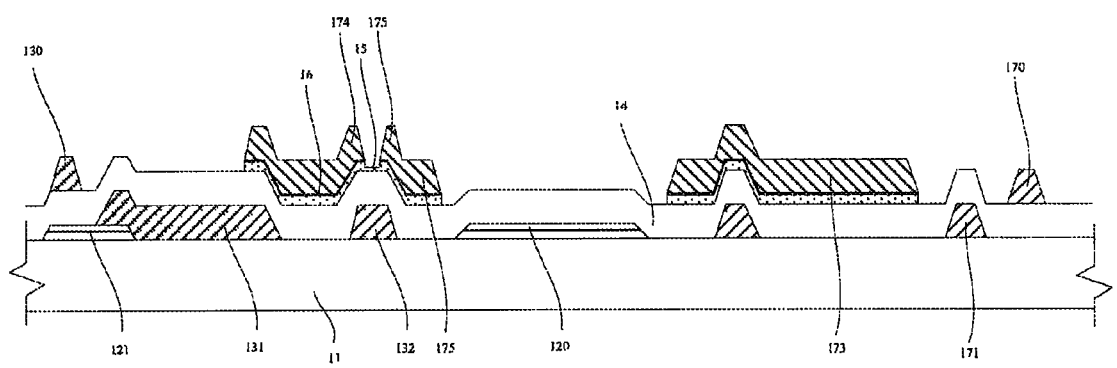
FIG. 9 shows a cross sectional view along the direction of GP-DP dotted line after the third patterning process.

Step 3, performing a third patterning process, comprising: forming the gate insulator layer 14, the semiconductor layer, the ohm contact layer and the data metal layer on the substrate which has formed a gate metal layer pattern, forming the gate short-circuit bar 130, the odd data short-circuit bar 170, the odd data lines 172, the even data lines 173, the source electrode 174, the drain electrode 175, the ohm contact layer 16 and the semiconductor active layer 15 by means of half tone mask exposure process or gray tone mask exposure process, wet etching process and dry etching process, as shown in FIGS. 8 and 9.

Figure 10:
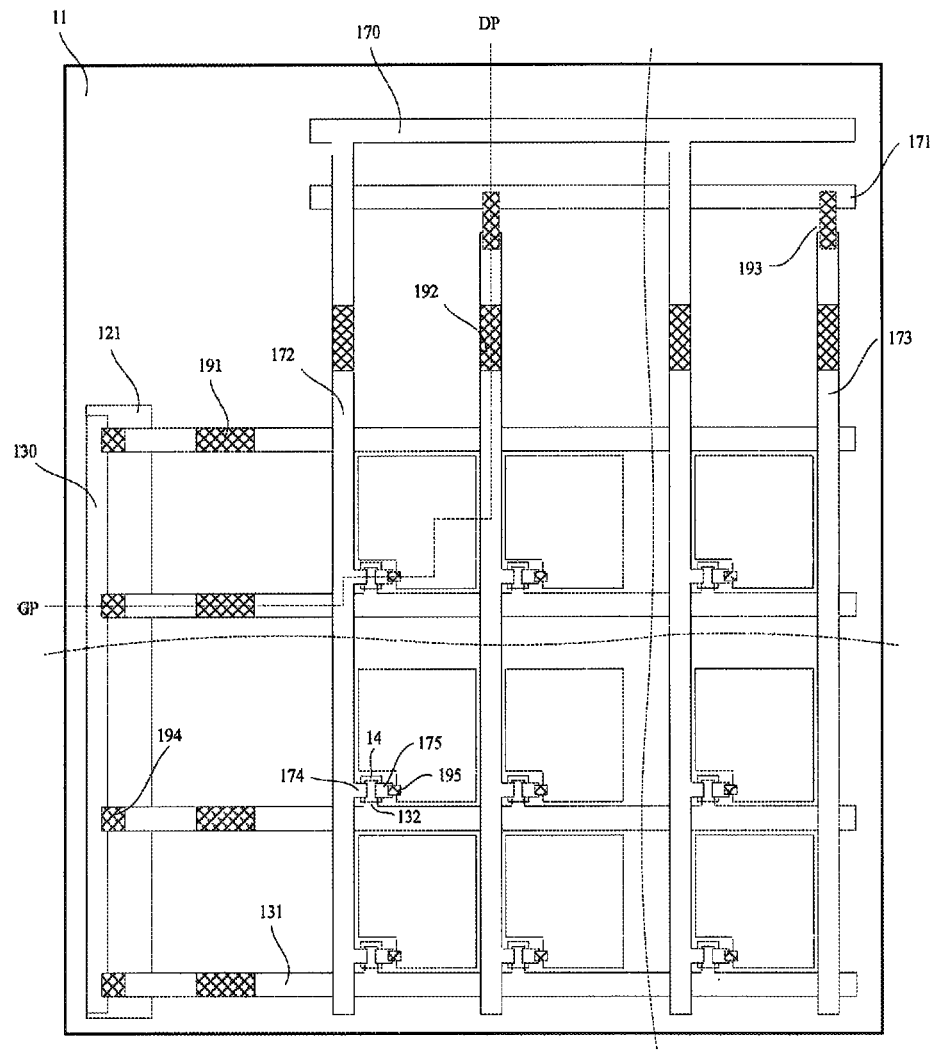
FIG. 10 shows a schematic view of plane structure of the array substrate after a forth patterning process.
Figure 11:
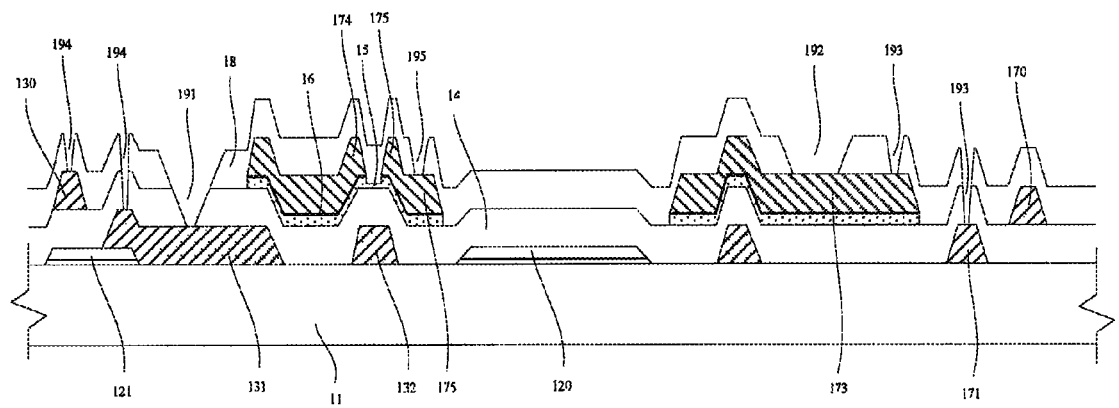
FIG. 11 shows a cross sectional view along the direction of GP-DP dotted line after the forth patterning process.

Step 4, performing a forth patterning process, comprising: forming the passivation layer 18 on the substrate which has formed a data metal layer pattern, forming various types of passivation layer via holes by means of once exposure and once dry etching process, the passivation layer via holes comprising: a Gate Pad via hole 191, a Date Pad via hole 192, a via hole 193 for connection between the even data lines and the even data short-circuit bar, a via hole 194 for connection between the gate lines and the gate short-circuit bar, a via hole 195 for connection between the pixel electrode and the drain electrode, as shown in FIGS. 10 and 11.

Figure 12:
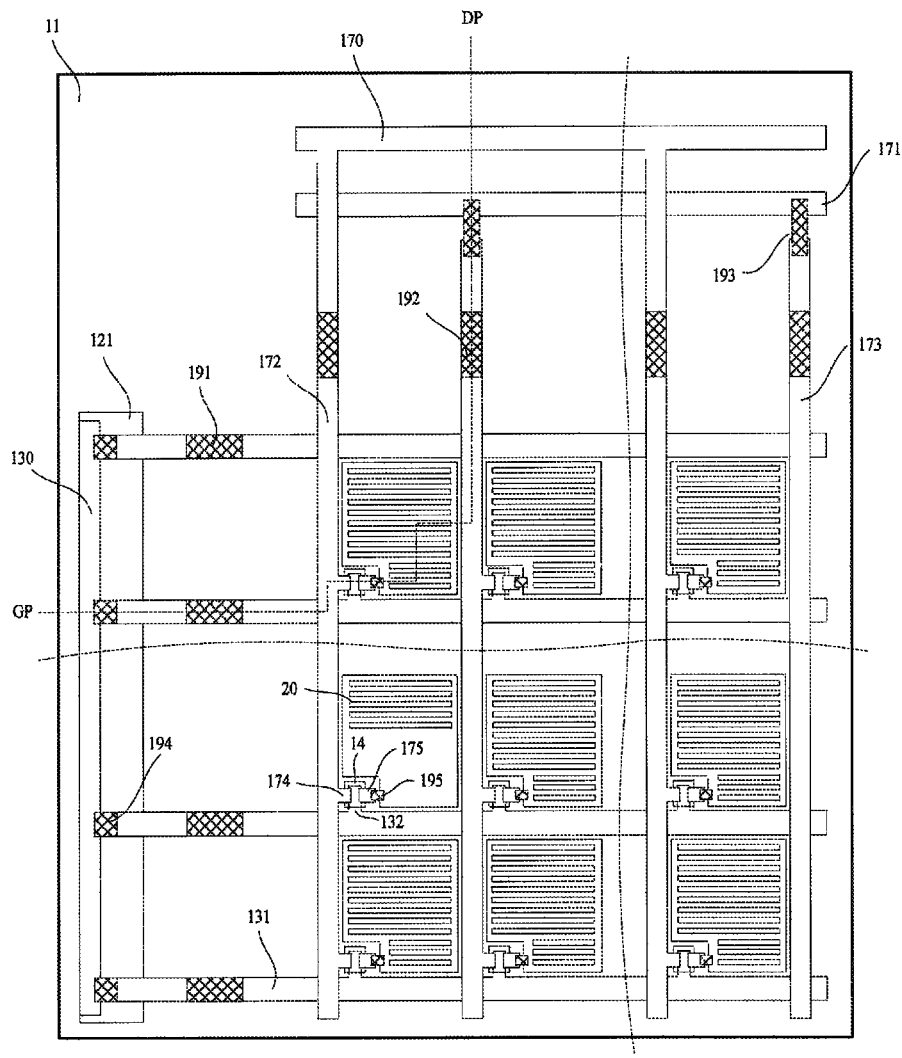
FIG. 12 shows a schematic view of plane structure of the array substrate after a fifth patterning process.
Figure 13:
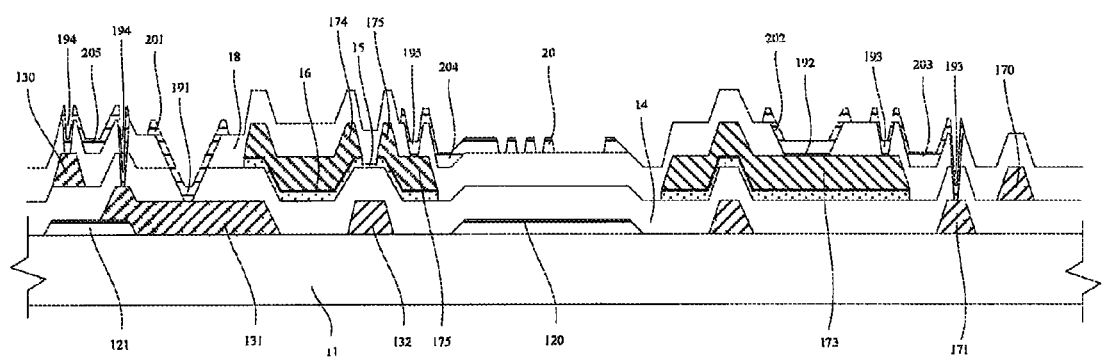
FIG. 13 shows a cross sectional view along the direction of GP-DP dotted line after the fifth patterning process.

Step 5, performing a fifth patterning process, comprising: forming the second transparent conducting layer on the substrate which has formed the passivation layer via holes, forming the pixel electrode 20 and the connection portion by means of once exposure and once wet etching process, the pixel electrode 20 is connected with the drain electrode 175 through the via hole 195, the connection portion is respectively connected with the gate lines 131 and the gate short-circuit bar 130 through the passivation layer via hole 194 so as to connect the gate lines 131 with the gate short-circuit bar 130, as shown in FIGS. 12 and 13.

The gate lines 131 are connected with the gate short-circuit bar 130 by the second transparent conducting layer thin film through the via hole 194, the even data lines 173 are connected with the even data short-circuit bar 171 by the second transparent conducting layer thin film through the via hole 193; meanwhile the second transparent conducting layer thin film formed at the Gate Pad via hole 191 and the Data Pad via hole 192 protects the metal electrodes from outside damage.

Figure 14:
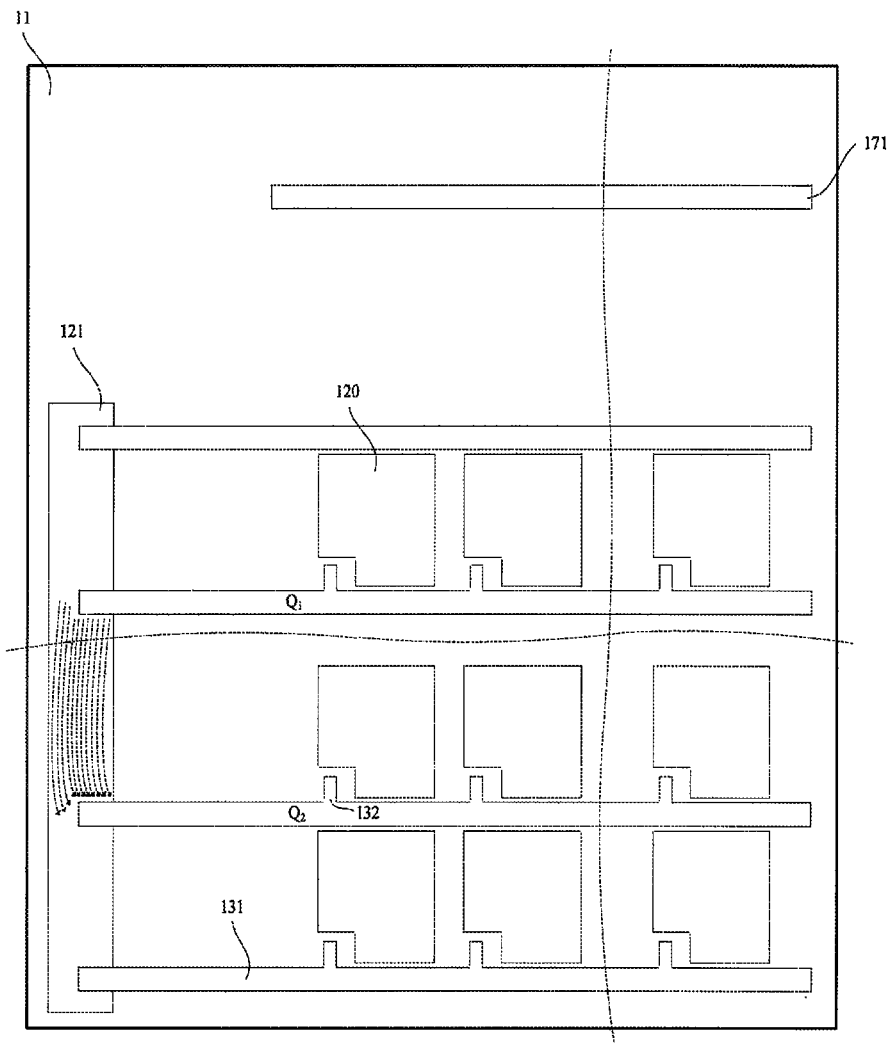
FIG. 14 shows a schematic view that the induced charges of different potentials transfer through the transparent conducting bar and achieve balance in the forming process of the gate insulator layer.

As shown in FIG. 14, in the patterning process of forming the common electrode 120, the process of forming the transparent conducting bar 121 at a preset position of the gate short-circuit 130 is synchronously performed, preferably, the width of the transparent conducting bar 121 is larger than the width of the gate short-circuit bar 130, the gate short-circuit bar 130 and the date lines are arranged in the same layer. In the process of gate insulator layer by plasma enhanced chemical vapor deposition, the gate metal layer pattern induces static charges under the effect of the plasma electric field, the induced charges Q1 or Q2 on different gate lines are in different potentials. These static charges can transfer through the transparent conducting bar 121 and achieve balance. The larger transparent conducting bar 121 adds the routes by which the static charges achieve balance. Moreover, the thickness of the transparent conducting layer is very thin and its resistivity is much larger than that of the gate metal, the increase of the resistance of the charge balance routes can reduce the flowing current formed by the transferring of the charges, and the gate short-circuit bar 130 is formed on the data metal layer, thus it can avoid the problem of burning the gate short-circuit bar 130 and even the gate lines 131 due to the occurrence of the static discharge.

Figure 3:
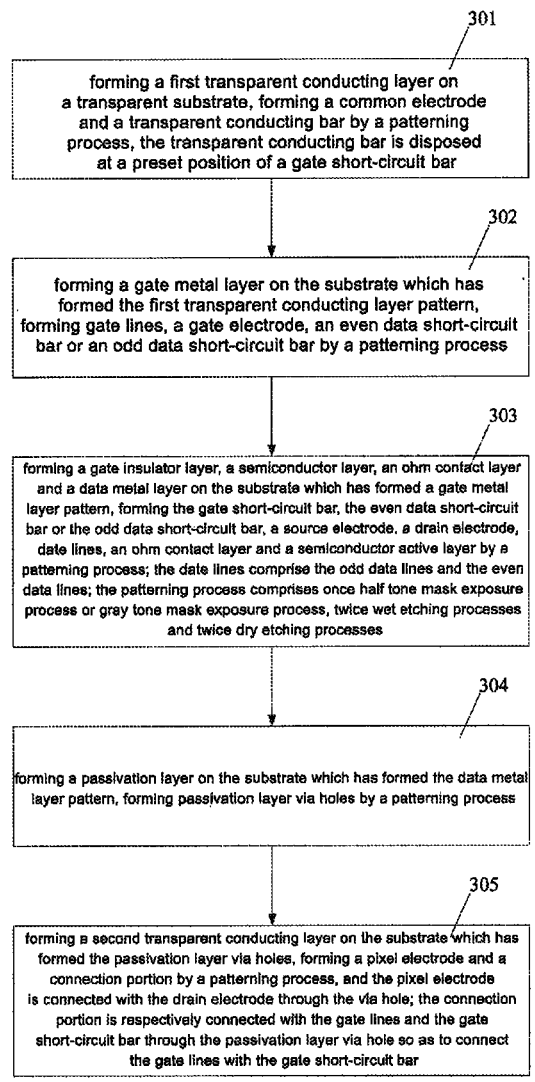
FIG. 3 shows a flow chart of a manufacturing method of the array substrate of the embodiment of the present invention.

The embodiment of the invention provides a manufacturing method of array substrate of LCD display, as shown in FIG. 3, the method comprises:

step 301, forming a first transparent conducting layer on a transparent substrate 11, forming a common electrode 120 and a transparent conducting bar 121 by a patterning process, the transparent conducting bar 121 is disposed at a preset position of a gate short-circuit bar 130;

step 302, forming a gate metal layer on the substrate which has formed the first transparent conducting layer pattern, forming gate lines 131, a gate electrode 132, an even data short-circuit bar 171 or an odd data short-circuit bar 170 by a patterning process;

step 303, forming a gate insulator layer 14, a semiconductor layer, an ohm contact layer and a data metal layer on the substrate which has formed a gate metal layer pattern, forming the gate short-circuit bar 130, the even data short-circuit bar 171 or the odd data short-circuit bar 170, a source electrode 174, a drain electrode 175, date lines, an ohm contact layer 16 and a semiconductor active layer 15 by a patterning process; the date lines comprise the odd data lines 172 and the even data lines 173. The patterning process comprises once half tone mask exposure process or gray tone mask exposure process, twice wet etching processes and twice dry etching processes.

The plane structure of the array substrate of LCD display manufactured by employing the method provided in the embodiment of the present invention is shown in FIG. 2, the transparent conducting bar 121 is added below the gate short-circuit bar 130, the width and the resistance of the transparent conducting bar 121 is larger than those of the gate short-circuit bar 130, in the forming process of the gate insulator layer, the induced charges on different potentials of the gate lines 131 transfer through the transparent conducting bar 121 in an flowing current which the transparent conducting bar can bear and achieve balance; and the gate short-circuit bar 130 is formed on the data metal layer, and it can avoid the problem of burning the gate short-circuit bar 130 and even the gate lines 131 due to the occurrence of the static discharge, the electrical defects in the array substrate can be normally detected and repaired in the array test process, thus the qualified product rate of the array substrate of LCD display is improved.

In a preferred embodiment, the width of the formed transparent conducting bar 121 is larger than the width of the gate short-circuit bar 130.

In a preferred embodiment, the gate mental layer is made of molybdenum, chromium, copper, molybdenum/aluminium/neodymium or molybdenum/aluminium/molybdenum multilayer films;

the date metal layer is made of molybdenum, chromium, copper, molybdenum/aluminium/neodymium or molybdenum/aluminium/molybdenum multilayer films.

Step 303 is followed by steps 304 and 305, wherein:

step 304, forming a passivation layer 18 on the substrate which has formed the data metal layer pattern, forming passivation layer via holes 191-195 by a patterning process; and step 305, forming a second transparent conducting layer on the substrate which has formed the passivation layer via holes, forming a pixel electrode 20 and a connection portion by a patterning process, and the pixel electrode 20 is connected with the drain electrode 175 through the via hole 195; the connection portion is respectively connected with the gate lines 131 and the gate short-circuit bar 130 through the passivation layer via hole 194 so as to connect the gate lines 131 with the gate short-circuit bar 130.

The even data short-circuit bar 171 or the odd data short-circuit bar 170 has already formed when forming the gate metal pattern in step 302, thereby another data short-circuit bar is formed in the step of forming the gate short-circuit bar 130, which comprising: if the odd data short-circuit bar 170 is formed in step 302, then the even data short-circuit bar 170 should be formed; if the even data short-circuit bar 171 is formed in step 302, then the odd data short-circuit bar 170 should be formed.

In a preferred embodiment, the first transparent conducting layer and the second transparent conducting layer are made of tin indium oxide, antimony doped tin oxide, aluminum doped zinc oxide or indium doped zinc oxide thin films.

The advantages of adopting the technical solution are that: as shown in FIG. 14, in the patterning process of forming the common electrode 120, the synchronously forming the transparent conducting bar 121 at a preset position of the gate short-circuit 130 is synchronously performed, the width of the transparent conducting bar 121 is larger than that of the gate short-circuit bar 130, the gate short-circuit bar 130 and the data lines are arranged in the same layer. In the process of gate insulator layer by plasma enhanced chemical vapor deposition, the gate metal layer pattern induces static charges under the effect of the plasma electric field, the induced charges accumulated on different potentials of the gate lines 131 can transfer through the transparent conducting bar 121 and achieve balance, because the width of the transparent conducting bar 121 is larger than the width of the gate short-circuit bar 130, the routes of the charge balance are increased. Moreover, the thickness of the transparent conducting layer is very thin and its resistivity is larger than that of the gate metal, the increase of the resistance of the charge balance routes can reduce the flowing current formed by the transferring of the charge; in addition, the gate short-circuit bar 130 is formed on the data metal layer, which is not affected by the occurrence of the static discharge in the gate insulator layer forming process, thus it can avoid the problem of burning the gate short-circuit bar 130 and even the gate lines 131 due to the occurrence of the static discharge. The electrical defects in the array substrate can be normally detected and repaired in the array test process, thus the qualified product rate of the array substrate of LCD display is improved.

The described above are the preferred embodiments of the present invention, it should be pointed out that, it can be made some improvement and embellish without departing from the principle of the present invention by those skilled in the art, these improvement and embellish should be seen as the protection scope of the present invention as well.

What is claimed is:

1. An array substrate of LCD display, comprising a transparent substrate, gate lines and data lines which are disposed on the transparent substrate, wherein the array substrate further comprises: a transparent conducting bar and a gate short-circuit bar which are disposed on the transparent substrate, the transparent conducting bar is disposed below the gate short-circuit bar, the gate short-circuit bar and the data lines are arranged in a same layer;

wherein a width of the transparent conducting bar is larger than a width of the gate short-circuit bar;

wherein the transparent conducting bar is in contact with the gate lines directly and connected to the gate lines; and wherein at least one part of a projection of the gate short-circuit bar onto the transparent substrate is overlapped with a projection of the transparent conducting bar onto the transparent substrate.

2. The array substrate according to claim 1, wherein the array substrate further comprises a common electrode disposed on the transparent substrate, the common electrode and the transparent conducting bar are arranged in the same layer.

3. The array substrate according to claim 1, wherein the array substrate further comprises:

a gate insulator layer, disposed on a gate electrode and the gate lines and covers the whole substrate;

a semiconductor active layer, data lines and the gate short-circuit bar, a source electrode and a drain electrode, disposed above the gate insulator layer;

a passivation layer, disposed on the source electrode and the drain electrode and covers the whole substrate, the passivation layer has passivation layer via holes formed at positions corresponding to the drain electrode, the gate lines and the gate short-circuit bar; and a transparent conducting layer disposed on the substrate which has formed on the passivation layer via holes; a pixel electrode formed based on the transparent conducting layer is disposed on the passivation layer and is connected with the drain electrode through the passivation layer via hole formed at the position corresponding to the drain electrode; a connection portion formed based on the transparent conducting layer is respectively connected with the gate lines and the gate short-circuit bar through the passivation layer via holes formed at the positions corresponding to the gate lines and the gate short-circuit bar so as to connect the gate lines with the gate short-circuit bar.

4. The array substrate according to claim 2, wherein the array substrate further comprises:

a gate insulator layer, disposed on a gate electrode and the gate lines and covers the whole substrate;

a semiconductor active layer, data lines and the gate short-circuit bar, a source electrode and a drain electrode, disposed above the gate insulator layer;

a passivation layer, disposed on the source electrode and the drain electrode and covers the whole substrate, the passivation layer has passivation layer via holes formed at positions corresponding to the drain electrode, the gate lines and the gate short-circuit bar; and a transparent conducting layer disposed on the substrate which has formed on the passivation layer via holes; a pixel electrode formed based on the transparent conducting layer is disposed on the passivation layer and is connected with the drain electrode through the passivation layer via hole formed at the position corresponding to the drain electrode; a connection portion formed based on the transparent conducting layer is respectively connected with the gate lines and the gate short-circuit bar through the passivation layer via holes formed at the positions corresponding to the gate lines and the gate short-circuit bar so as to connect the gate lines with the gate short-circuit bar.

5. A manufacturing method of array substrate of LCD display, wherein the method comprises:

forming a first transparent conducting layer on a transparent substrate, forming a common electrode and a transparent conducting bar by a patterning process; the transparent conducting bar is disposed at the preset position of a gate short-circuit bar;

forming a gate metal layer on the substrate which has formed the first transparent conducting layer pattern, forming gate lines, a gate electrode, an even data short-circuit bar or an odd data short-circuit bar by a patterning process; and forming a gate insulator layer, a semiconductor layer, an ohm contact layer and a data metal layer on the substrate which has formed a gate metal layer pattern, forming the gate short-circuit bar, the odd data short-circuit bar or the even data short-circuit bar, odd data lines, even data lines, a source electrode, a drain electrode and a semiconductor active layer by a patterning process, the patterning process comprises half tone mask exposure process or gray tone mask exposure process;

wherein a width of the formed transparent conducting bar is larger than a width of the gate short-circuit bar;

wherein the transparent conducting bar is in contact with the gate lines directly and connected to the gate lines; and wherein at least one part of a projection of the gate short-circuit bar onto the transparent substrate is overlapped with a projection of the transparent conducting bar onto the transparent substrate.

6. The method according to claim 5, wherein the gate metal layer is made of molybdenum, chromium, copper, molybdenum/aluminium/neodymium or molybdenum/aluminium/molybdenum multilayer films;

the data metal layer is made of molybdenum, chromium, copper, molybdenum/aluminium/neodymium or molybdenum/aluminium/molybdenum multilayer films.

7. The method according to claim 6, wherein the method further comprises:

forming a passivation layer on the substrate which has formed the data metal layer pattern, and forming passivation layer via holes by a patterning process; and forming a second transparent conducting layer on the substrate which has formed on the passivation layer via holes, forming a pixel electrode and a connection portion by a patterning process, and the pixel electrode is connected with the drain electrode through the passivation layer via hole formed at a position corresponding to the drain electrode, the connection portion is respectively connected with the gate lines and the gate short-circuit bar through the passivation layer via holes formed at positions corresponding to the gate lines and the gate short-circuit bar so as to connect the gate lines with the gate short-circuit bar.

8. The method according to claim 7, wherein the first transparent conducting layer and the second transparent conducting layer are made of tin indium oxide, antimony doped tin oxide, aluminum doped zinc oxide or indium doped zinc oxide thin films.

* * * * *